(12) United States Patent
Rune et al.

(10) Patent No.: US 6,618,589 B1
(45) Date of Patent: Sep. 9, 2003

(54) METHOD FOR PERFORMING CELL AND URA UPDATES IN A RADIO ACCESS NETWORK

(75) Inventors: Göran Rune, Linköping (SE); Alain Maupin, Sollentuna (SE); Gert-Jan van Lieshout, Apeldoorn (NL); Pontus Wallentin, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/693,599

(22) Filed: Oct. 20, 2000

Related U.S. Application Data

(60) Provisional application No. 60/161,768, filed on Oct. 27, 1999.

(51) Int. Cl.[7] .................................................. H04Q 7/20
(52) U.S. Cl. ........................................ 455/435; 455/433
(58) Field of Search ................................ 455/433, 435, 455/432, 436

(56) References Cited

U.S. PATENT DOCUMENTS

| | | | | |
|---|---|---|---|---|
| 5,832,381 A | * | 11/1998 | Kauppi | 455/432 |
| 6,324,399 B1 | * | 11/2001 | Salmivalli | 455/433 |
| 6,341,220 B1 | * | 1/2002 | Hurme | 455/433 |

FOREIGN PATENT DOCUMENTS

| | | |
|---|---|---|
| WO | WO 93/25051 | 12/1993 |
| WO | WO 98/37721 | 8/1998 |
| WO | WO 99/41926 | 8/1999 |

OTHER PUBLICATIONS

Lin et al., Movement–Based Location Update and Selective Paging for PCS Networks, Aug. 1996, vol. 4, pp. 629–638.*
*Selected Areas in Communications*, a publication of the IEEE Communications Society; Oct. 1997; vol. 15; No. 8; pp. 1425–1436; XP000721275.
ISR PCT/SE 00/02102; date completed Mar. 26, 2001.

* cited by examiner

*Primary Examiner*—Lee Nguyen
(74) *Attorney, Agent, or Firm*—Jenkens & Gilchrist, P.C.

(57) ABSTRACT

A method for performing Cell-Updates or URA-Updates in a mobile communication system is disclosed, whereby a User Equipment (UE) sends a Cell-Update message or URA-Update message to an SRNC. The-transported Cell-Update message or URA-Update message includes a sequence counter which is incremented each time the UE sends such a message to the SRNC. The SRNC stores the value of the sequence counter for each Cell-Update message or URA-Update message received and acknowledged. If the SRNC receives a Cell-Update message or URA-Update message with a corresponding sequence counter value'that is lower than the sequence counter value stored for the previously received Cell-Update message or URA-Update message, then the SRNC ignores the received Cell-Update message or URA-Update message. Also, the SRNC does not store the sequence counter value for the ignored, received Cell-Update message or URA-Update message.

38 Claims, 4 Drawing Sheets

METHOD FOR PERFORMING CELL AND URA UPDATES IN A RADIO ACCESS NETWORK

CROSS-REFERENCES TO RELATED APPLICATIONS

This Application for Patent claims the benefit of priority from, and hereby incorporates by reference the entire disclosure of, co-pending U.S. Provisional Application for Patent Serial No. 60/161,768, filed Oct. 27, 1999.

BACKGROUND OF THE INVENTION

1. Technical Field of the Invention

The present invention relates in general to the mobile communications field and, in particular, to a method for protecting cell and URA (Universal Mobile Telecommunications System Terrestrial Radio Access Network Registration Area) update message sequences.

2. Description of Related Art

The Universal Mobile Telecommunications System (UMTS) is the European version of the so-called third generation communication system, and is being developed under the auspices of the European Telecommunication Standards Institute (ETSI) The network component of the UMTS is referred to as the UMTS Terrestrial Radio Access Network (UTRAN). FIG. 1 is a block diagram of an architecture that has been developed for the UTRAN.

Referring to FIG. 1, the UTRAN architecture 10 shown includes a Core Network 12. A User Equipment (UE) 19, which is typically a mobile terminal, is used by a subscriber to access the services offered by an operator through the Core Network 12. The Core Network 12 is coupled to a Radio Network Controller (RNC) 16a, which controls radio resources and connectivity within a set of cells (e.g., cells 20a–e). Although only one RNC 16a is shown coupled via an interface to the Core Network 12, this arrangement is for illustrative purposes only. It should be understood that more than one RNC (e.g., 16a–c) can be coupled via an interface to the Core Network 12.

A cell (e.g., 20a) defines a geographical area where radio coverage is provided by radio transceiver equipment located at a radio base station site. Each such cell is identified with a unique identity, which is broadcast within that respective cell.

A URA (e.g., 18a) defines a geographical area composed of one or more cells (e.g., 20a and 20b). Each such URA is identified with a unique identity, which is broadcast within all cells belonging to that respective URA. As such, a URA can be composed of cells controlled by more than one RNC. A URA with cells controlled by more than one RNC can have an overlap between RNCs (i.e., an Overlapping URA).

A Signalling Network (e.g., Signalling System No. 7) 14 is coupled to the RNCs 16a–c. The Signalling Network 14 enables the RNCs to perform the requisite RNC-to-RNC signalling, in order to maintain established connections when a UE is moving between cells controlled by different RNCs in the Radio Access Network.

For each Core Network-UE connection, the role of an RNC can be two-fold. One role of such an RNC is that of a Serving RNC (SRNC). In this role, the RNC is in charge of the connection with the UE. In other words, this RNC has full control of this connection within the Radio Access Network. As such, this RNC is connected to the Core Network 12.

The second role of such an RNC is that of a Drift RNC (DRNC). In this role, the RNC supports the SRNC with radio resources for a connection with the UE, which needs radio resources in cells controlled by the DRNC.

Typically, the Radio Access Network 10 determines the role of an RNC (i.e., SRNC or DRNC) when the UE-Core Network connection is being established. Normally, the RNC that controls the cell where the connection to the UE is initially established, is assigned the SRNC role for this UE connection. As the UE moves, the connection is maintained by establishing radio communication branches via new cells, which can also involve cells controlled by other RNCs (e.g., DRNCs).

The above-described RNC roles are also relevant when a UE is using shared resources and experiencing at least some activity (i.e., some transfer of user data, or a $CELL_{13}$ FACH state). Furthermore, these RNC roles are also relevant when a UE is using shared resources and operating in a low activity state (i.e., no transfer of user data, or a $CELL_{13}$ PCH or $URA_{13}$ PCH state). In the $CELL_{13}$ FACH and $CELL_{13}$ DCH states, the UE reports its location on a cell basis (Cell Update). In the $URA_{13}$ PCH state, the UE only reports its location on a URA basis (URA Update). These RNC roles are relevant for all of the above-mentioned states, because control of the UEs in these states remains in the SRNC.

FIG. 2 is a diagram that illustrates state models for a UE. Referring to FIG. 2, a UE enters the Idle Mode 4 after power on. In this mode, the UE is not connected to the UTRAN. When a connection is established, the UE enters the Connected Mode 2. As such, there are four states in the Connected Mode. Each such state reflects a certain level of activity.

The CELL_DCH state 7 is characterized by a dedicated channel (DCH) assigned to the UE. Macro-diversity can be used between DCHs of several cells.

In the CELL_FACH state 8, no dedicated physical channel is assigned. However, the UE listens continuously to a common channel (the FACH) in the downlink belonging to the selected cell. In the uplink, the UE typically uses a random access channel (RACH). During each cell re-selection, the UE updates the network with the UE's current cell location.

In the CELL_PCH state 6, the UE monitors a paging channel (PCH) of a selected cell. On the PCH, the UE uses discontinuous reception (DRX) to save power. The scheme about when the UE should listen is made in accordance with an agreement between the network and the UE, on a per UE basis. Also, at this point, the UE updates the network with the UE's current cell location at cell re-selection.

The URA_PCH state 5 is similar to the CELL_PCH state 6. However, in the URA_PCH state 5, the UE only updates the network about the UE's location after the UE has crossed a URA border. A URA is a group of cells. Consequently, in this state, the location of the UE is generally known only at the URA level.

FIG. 3 is a block diagram of the UTRAN architecture shown in FIG. 1, which further illustrates the RNCs' roles. Referring to FIG. 3, RNC1 16a functions as an SRNC for the connections to UE1 19, UE2 27 and UE3 28. After successive Cell- or URA-Updates, the connection to UE2 27 is now routed via a cell 25 and URA 23a controlled by RNC2 16b, which functions as a DRNC for this connection. After successive Cell- or URA-Updates, the connection to UE3 28 is now routed via a cell 26 and URA 23a controlled by RNC3 16c, which functions as a DRNC for this connection.

FIG. 4 is a block diagram of the UTRAN architecture shown in FIG. 1, which illustrates how Cell-Update procedures are performed. As mentioned earlier, when a UE is in a CELL_PCH or CELL_FACH state, the UE reports a change in its location when it moves from one cell to another (Cell Update). Referring to FIG. 4, it can be seen that UE1 19 performs a Cell-Update when moving from cell 1:2 20b to cell 1:3 20c, UE2 27 performs a Cell-Update when moving from cell 2:5 25a to cell 3:1 25b, and UE3 28 performs a Cell-Update when moving from cell 3:3 26a to cell 3:4 26b. When UE3 28 performs a Cell-Update, the Cell-Update is conveyed to the SRNC for UE3 (i.e., RNC1 16a). The procedure used to convey the Cell Update to the SRNC is shown by the time-sequence diagram in FIG. 5.

FIG. 5 shows an RNC-to-RNC signalling procedure used to support a Cell-Update from an RNC (the DRNC) other than the RNC where the connection with the network was established (the SRNC). As shown by the procedure 30 in FIG. 5, the DRNC sends a Cell Update Request message 32 to the SRNC. In response, the SRNC sends a Cell Update Response message 34 to the DRNC. A corresponding procedure for use on the radio air interface, which is also referred to as a Cell-Update procedure, is described with respect to FIG. 6. As shown by the procedure 36 in FIG. 6, the UE sends a Cell Update Request message 37 to the RNC involved. In response, that RNC sends a Cell Update Response message 39 to that UE.

As mentioned above, when the UE involved is in a URA_PCH state (role), the UE only reports a change in its location when moving from one URA to another. This procedure is called a URA-Update. As such, the UE can remain in the URA_PCH state even after the URA-Update procedure has been completed (i.e., the next contact with the network is made when the UE passes a new URA border). Actually, even if the UE is typically in the URA_PCH state after the URA update procedure has been completed, there is a state transition during the URA update procedure. Since no uplink messages can be transmitted from the UE in the URA_PCH state, the UE moves from the URA_PCH state to the CELL_FACH state in order to perform the URA update procedure. In the URA_PCH state, the URA update request and response messages are exchanged. When the UE receives the URA update response message, the UE typically returns to the URA_PCH state.

FIG. 7 is a diagram of the Radio Access Network architecture of FIG. 1, which illustrates how URA-Update procedures are performed. Referring to FIG. 7, it can be seen that UE1 19 performs a URA-Update when moving from URA 1 18a to URA 2 18b. The UE2 27 does not perform a URA-Update despite having moved from a cell 25a controlled by RNC2 16b to a cell 25b controlled by RNC3 16c, with both of these cells within URA 5 18e. The UE3 28 performs a URA-Update when moving from URA 5 18e to URA 6 18f.

Also as shown in FIG. 7, when the UE3 28 performs a URA-Update procedure, this information is conveyed to the SRNC for the UE3, or RNC1 16a. The procedure used to convey the URA-Update message to the SRNC is shown in FIG. 8. As such, the diagram in FIG. 8 shows the RNC-to-RNC signalling procedure used to support a URA-Update procedure from an RNC (the DRNC) other than the RNC where the connection with the network was established (the SRNC). The corresponding procedure performed on the radio air interface is also called a URA-Update. A diagram that illustrates the UE-to-RNC signalling procedure used to support a URA-Update from an involved UE is shown in FIG. 9. As such, referring to the procedure 46 shown in FIG. 9, the UE involved sends a URA-Update Request message 48 to the RNC involved. In response, the RNC sends a URA-Update Response message 49 to the UE.

The existing UMTS technical specifications include a function/procedure referred to as "Relocation". The main purpose of this function/procedure is to transfer control of a particular UE from the SRNC to another node. The Relocation procedure covers both internal UMTS relocations and relocations to other systems (e.g., Global System for Mobile Communications or GSM). As such, the main purpose of a UMTS-to-UMTS relocation is to transfer the role of an SRNC from one RNC to another (e.g., if there is no support for RNC-to-RNC communication between the involved RNCs, or to optimize transmission).

Two types of Relocation functions/procedures have been defined. One type is Relocation with UE involvement. In this case, the role of the SRNC is transferred from one RNC to another at the same time the radio interface communication is handed over from one cell to another. The second type is Relocation without UE involvement. In this case, the role of the SRNC is transferred from one RNC to another without changing the cell being used for the radio interface communication. The Relocation function/procedure is carried out primarily via the Core Network-RNC interface.

Preferably, a Relocation is initiated by an SRNC. The Relocation can be triggered by a Cell Update or URA Update. However, a Relocation can also be triggered by other events. If a Relocation is triggered by a Cell Update or URA Update, then the response message to the UE is sent by the new SRNC.

State of the Art

Currently, the Cell-Update and URA-Update procedures in the UMTS do not account for the possibility that Cell Update Request messages or URA Update Request messages may be received by an SRNC "out-of-sequence". In other words, although a certain Cell Update Request message (e.g., message A), can be sent by a UE prior to another Cell Update Request message (e.g., message B), the first (A) message can be received at the SRNC after the second (B) message is received. As such, there is no way to prevent problems from occurring during the operation of the cellular network due to the above-described phenomenon.

Currently, in the GSM, the Location Area Update message sent by a UE to the network (thereby reporting the location of the UE on a "Location Area" basis) includes information about the "old" Location Area. This information can be used by the network to avoid some of the errors resulting from those cases where the sequence of sent messages (also including signalling messages within the network) is not maintained.

A significant problem with the existing UMTS architecture is that if a UE is moving fast enough through the cellular network, the UE might initiate a Cell Update in one cell, and very soon after that, initiate a second Cell Update in another cell. If these two cells are connected to two different RNCs (e.g., cell A and cell B are controlled by different DRNCs, or cell A is controlled by the SRNC and cell B is controlled by a DRNC), the delay times that the two Cell Update messages are subjected to while being transported to the SRNC can be different. Consequently, the second Cell Update message can be received by the SRNC before the first Cell Update message. For similar reasons, the same problem can occur for two transported URA Update messages. In other words, if a UE is moving fast enough through the cellular network, the UE might initiate a URA Update in one cell, and very soon after that, change the URA (and cell) and initiate a second URA Update in another cell. If these two cells are connected to two different RNCs (e.g., cell A and cell B are controlled by different DRNCs, or cell A is controlled by the SRNC and cell B is controlled by a DRNC), the delay times that the two URA Update messages are subjected to while being transported to the SRNC can be different. Consequently, the second URA Update message can be received by the SRNC before the first URA Update message. As such, the existing UMTS specifications provide no way of ensuring that the sequences of Cell Update messages or URA Update messages are maintained from the UE to the SRNC.

Furthermore, the existing UMTS specifications include no methods for ensuring that the sequence of the Cell Updates or URA Updates, as perceived by the SRNC, is maintained the same as when the sequence is sent from the UE also after a Relocation of the SRNC's role to a new RNC. Nevertheless, as described in detail below, the present invention successfully resolves the above-described problems and other related problems.

SUMMARY OF THE INVENTION

In accordance with a preferred embodiment of the present invention, a method for performing Cell- or URA-Updates in a mobile communication system is provided, whereby a UE sends a Cell-Update message or URA-Update message to an SRNC. The transported Cell-Update message or URA-Update message includes a sequence counter which is incremented each time the UE sends such a message to the SRNC. The SRNC stores the value of the sequence counter for each Cell-Update message or URA-Update message received and acknowledged. If the SRNC receives a Cell-Update message or URA-Update message with a corresponding sequence counter value that is lower than the sequence counter value stored for the previously received Cell-Update message or URA-Update message, then the SRNC ignores the received Cell-Update message or URA-Update message. Also, the SRNC does not store the sequence counter value for the ignored, received Cell-Update message or URA-Update message. Using this method, the SRNC can ensure that Cell-Update messages and URA-Update messages sent from a UE are handled in sequential order.

Furthermore, when a Relocation procedure is performed, the Cell Update sequence counter (Cell_Upd_Seq_No) and URA Update sequence counter (URA_Upd_Seq_No) is sent from the old SRNC to the new SRNC. If the Relocation procedure was triggered by a Cell Update, then the old SRNC sends the received sequence counter for Cell Updates, and the stored sequence counter for URA Updates. The new SRNC does not send the response to the Cell Update to the UE until the new SRNC has received the sequence counters (for both the Cell Updates and URA Updates) from the old SRNC. If the Relocation procedure was triggered by a URA Update, then the old SRNC sends the received sequence counter for URA Updates, and the stored sequence counter for Cell Updates. The new SRNC does not send the response to the URA Update to the UE until the new SRNC has received the sequence counters (for both the Cell Updates and URA Updates) from the old SRNC.

An important technical advantage of the present invention is that a method for performing Cell- or URA-Updates is provided, whereby an SRNC can ensure that only the last Cell-Update message or URA-Update message sent from a UE can be handled by the SRNC in those cases where the order in which the Cell-Update messages or URA-Update messages were sent by the UE is not maintained by the SRNC when received.

Another important technical advantage of the present invention is that a method for performing Cell- or URA-Updates is provided, whereby an SRNC can maintain accurate information about the location of a UE despite receiving out-of-sequence Cell-Update messages or URA-Updates messages from the UE.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–11 of the drawings, like numerals being used for like and corresponding parts of the various drawings.

Essentially, in accordance with a preferred embodiment of the present invention, a method for performing Cell- or URA-Updates in a mobile communication system is provided, whereby a UE sends a Cell-Update message or URA-Update message to an SRNC. The transported Cell-Update message or URA-Update message includes a sequence counter which is incremented each time the UE sends such a message to the SRNC. The SRNC stores the value of the sequence counter for each Cell-Update message or URA-Update message received and acknowledged. If the SRNC receives a Cell-Update message or URA-Update message with a corresponding sequence counter value that is lower than the sequence counter value stored for the previously received Cell-Update message or URA-Update message, then the SRNC ignores the received Cell-Update message or URA-Update message. Also, the SRNC does not store the sequence counter value for the ignored, received Cell-Update message or URA-Update message. Using this method, the SRNC can ensure that Cell-Update messages and URA-Update messages sent from a UE are handled in sequential order.

Furthermore, when a Relocation procedure is performed, the Cell Update sequence counter (Cell_Upd_Seq_No) and URA Update sequence counter (URA_Upd_Seq_No) is sent from the old SRNC to the new SRNC. If the Relocation procedure was triggered by a Cell Update, then the old SRNC sends the received sequence counter for Cell Updates, and the stored sequence counter for URA Updates. The new SRNC does not send the response to the Cell Update to the UE until the new SRNC has received the sequence counters (for both the Cell Updates and URA Updates) from the old SRNC. If the Relocation procedure was triggered by a URA Update, then the old SRNC sends the received sequence counter for URA Updates, and the stored sequence counter for Cell Updates. The new SRNC does not send the response to the URA Update to the UE until the new SRNC has received the sequence counters (for both the Cell Updates and URA Updates) from the old SRNC.

Figure 1:
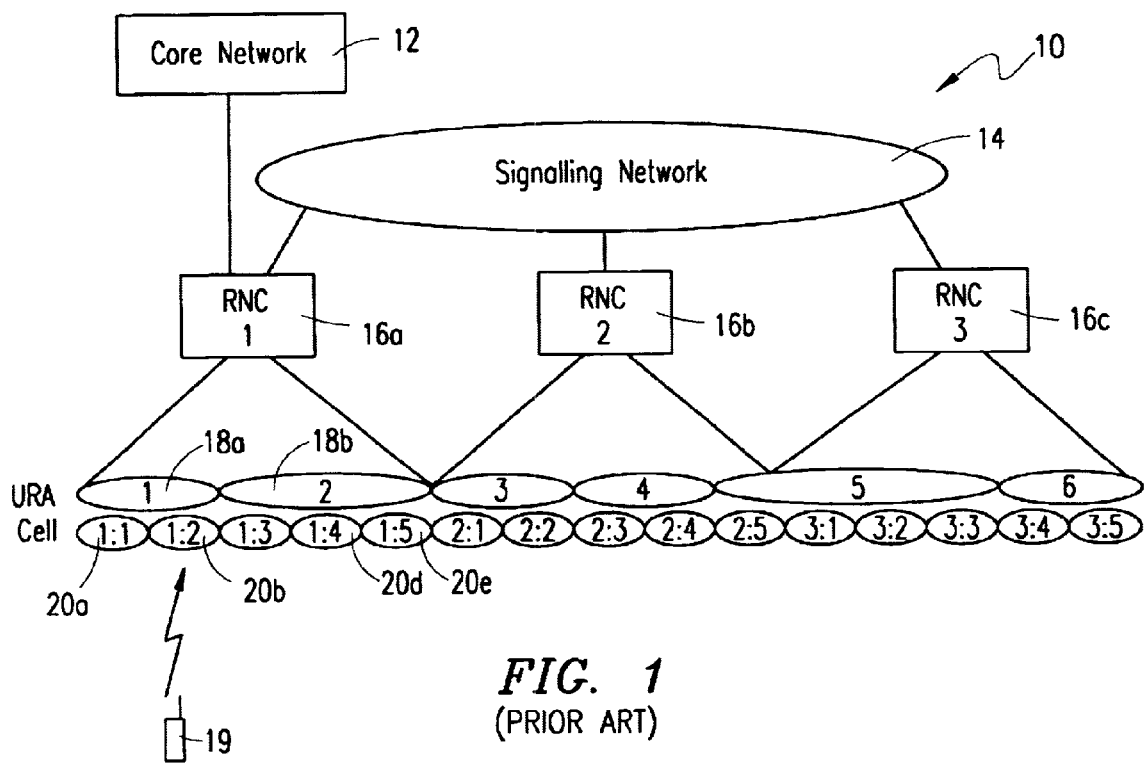
FIG. 1 is a block diagram of an architecture that has been developed for the UTRAN.
Figure 2:
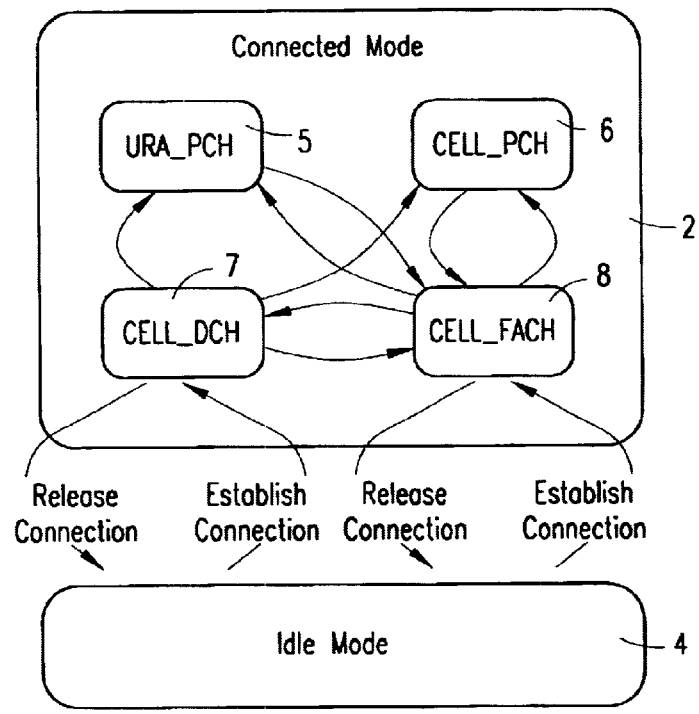
FIG. 2 is a diagram that illustrates state models for a UE.
Figure 3:
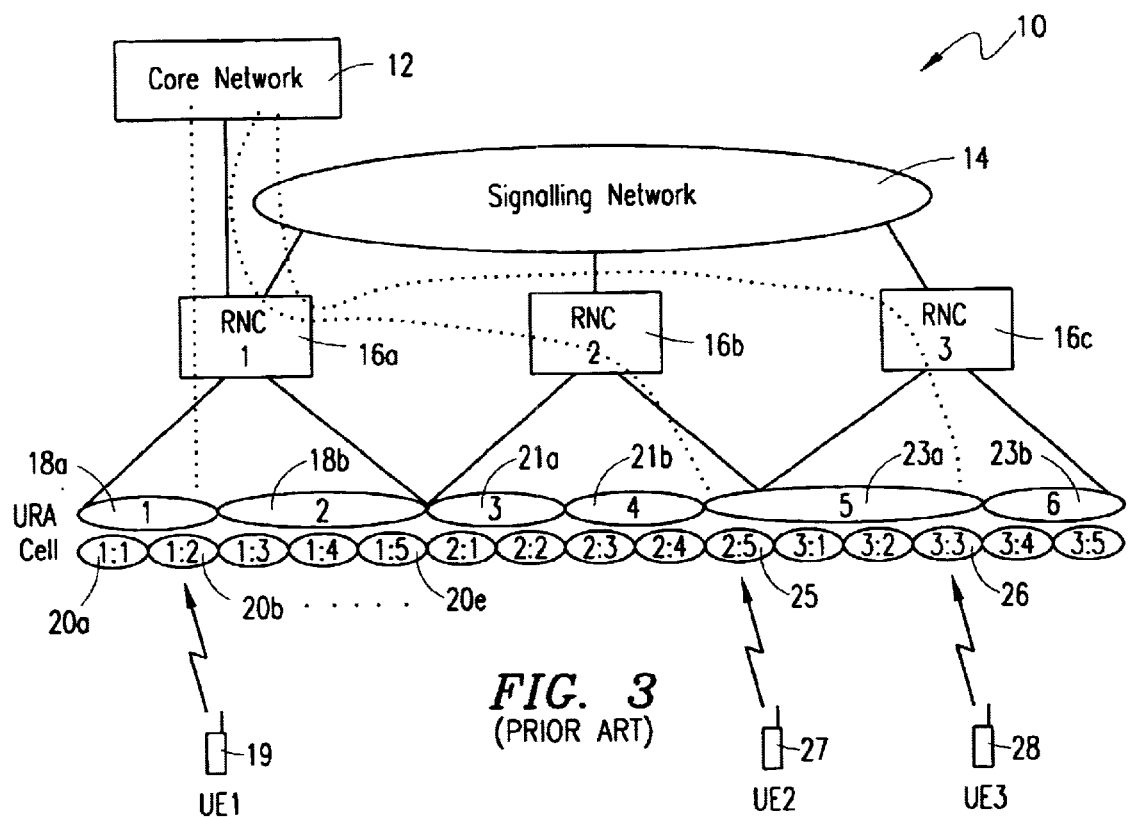
FIG. 3 is a block diagram of the UTRAN architecture shown in FIG. 1, which illustrates the roles of RNCs.
Figure 4:
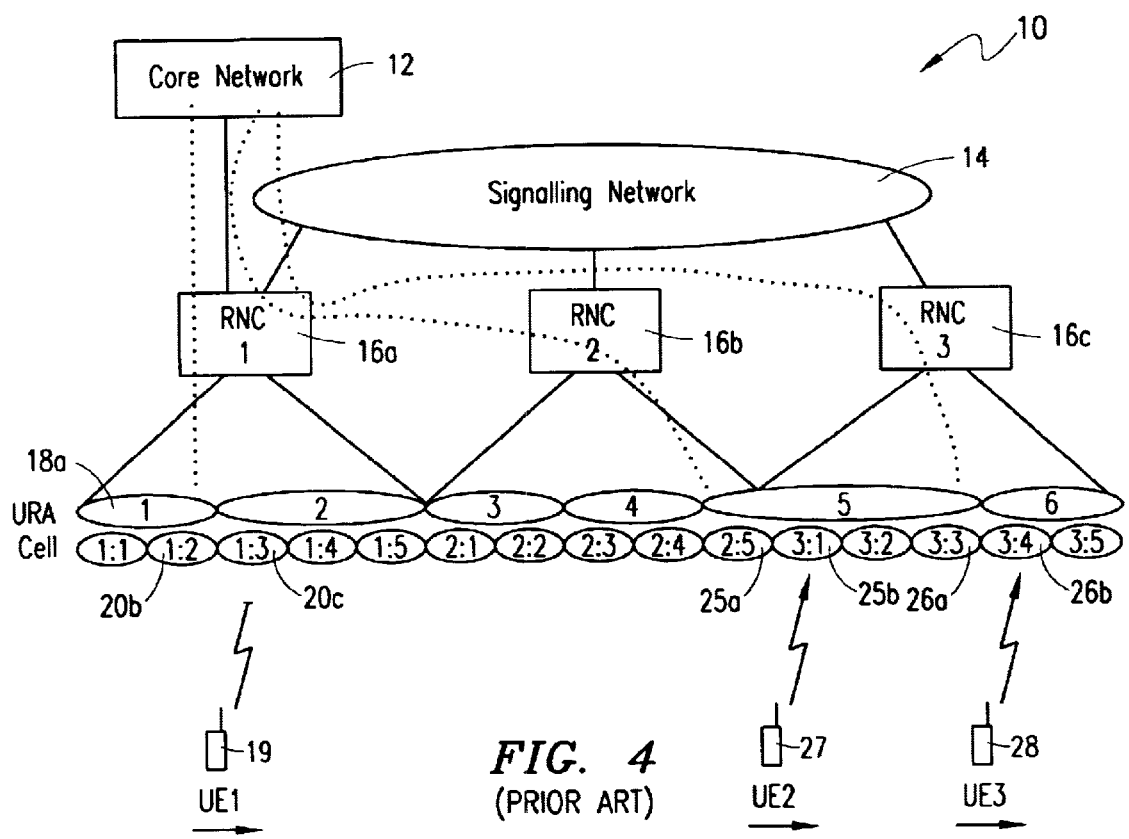
FIG. 4 is a block diagram of the UTRAN architecture shown in FIG. 1, which illustrates how Cell-Update procedures are performed.
Figure 5:
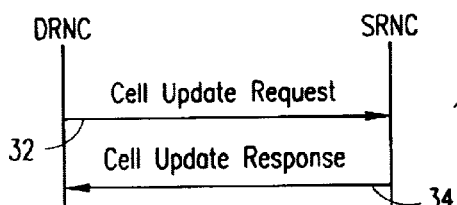
FIG. 5 is a diagram that shows an RNC-to-RNC signalling procedure used to support a Cell-Update from an RNC other than the RNC where the connection with the network was established.
Figure 6:
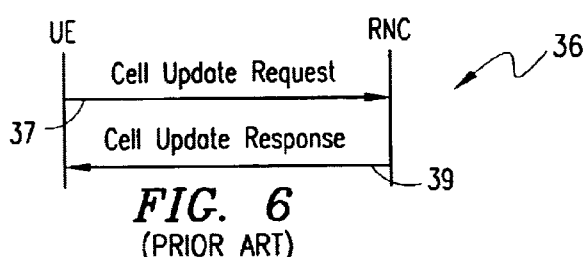
FIG. 6 is a diagram that illustrates the UE-to-RNC signalling procedure used to support a Cell-Update from a UE.
Figure 7:
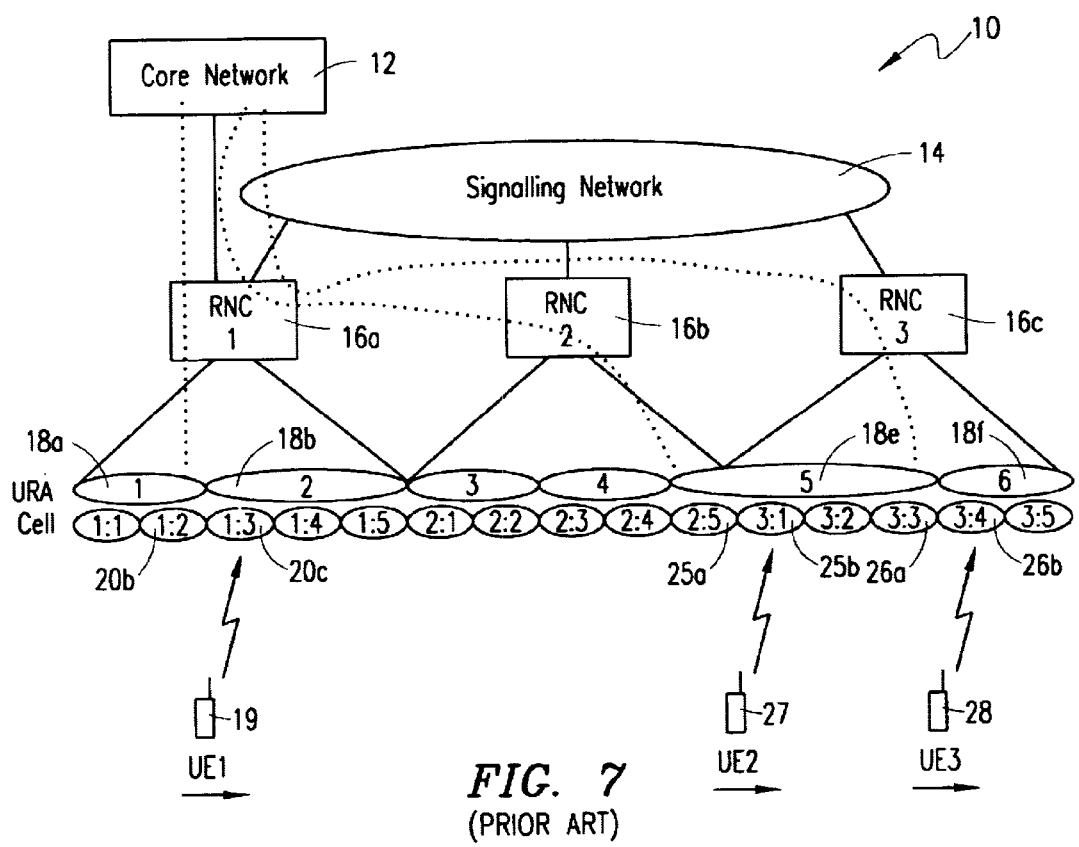
FIG. 7 is a diagram of the Radio Access Network architecture of FIG. 1, which illustrates how URA-Update procedures are performed.
Figure 8:
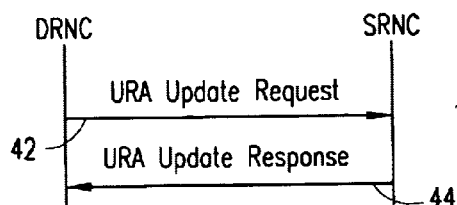
FIG. 8 is a diagram that shows the RNC-to-RNC signalling procedure used to support a URA-Update procedure from an RNC other than the RNC where the connection with the network was established.
Figure 9:
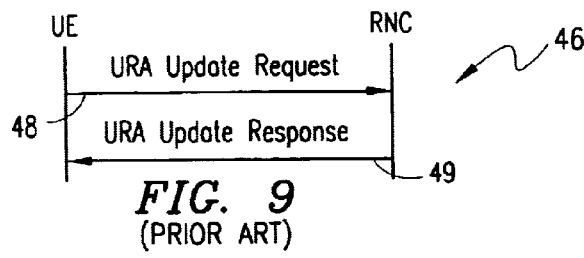
FIG. 9 is a diagram that illustrates the UE-to-RNC signalling procedure used to support a URA-Update from a UE.
Figure 10:
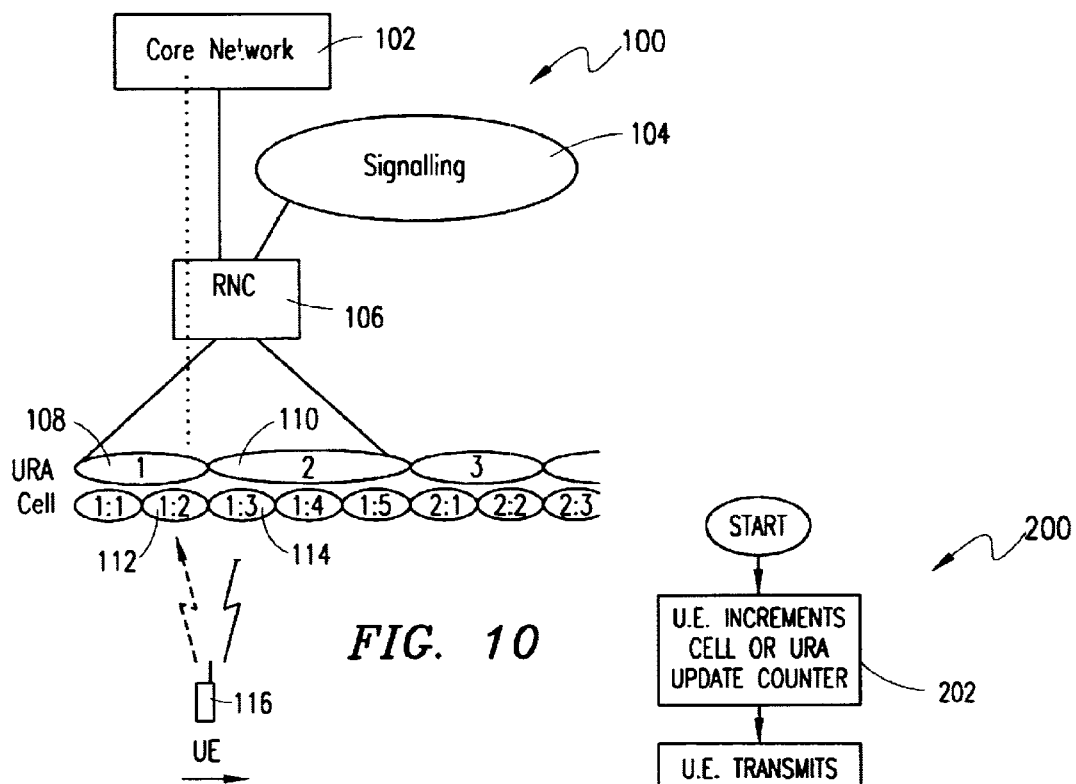
FIG. 10 is a diagram of an exemplary portion of a mobile communication system, which can be used to implement a preferred embodiment of the present invention.

Specifically, FIG. 10 is a diagram of an exemplary portion of a mobile communication system 100, which can be used to implement a preferred embodiment of the present invention. As shown, system portion 100 can be part of a UMTS. However, the present invention is not intended to be limited to a particular system or network type or arrangement, and can include any appropriate communication system or network where it is advantageous for a network entity, such as for example, a radio network control unit, to ensure that received signalling or control messages can be handled sequentially if such sequencing matters.

For this exemplary embodiment, the system portion 100 includes a core network component 102, a signalling network component 104, and at least one RNC component 106. The core network component 102 can be used by a network operator to provide subscribers with access-to services. The signalling network component 104 can be an SS7 network, but the present invention is not necessarily limited to such a network and can include any appropriate type of network that can route signalling information between network entities (e.g., between RNCs). For example, the signalling network component can route signalling information between the RNC 106 shown and another RNC (not explicitly shown). In any event, for this exemplary embodiment, the network components shown in system portion 100 can be implemented and operated in accordance with the established UTRAN specifications.

The system 100 also includes a UE 116, which for this embodiment, is a mobile radio terminal. The UE 116 communicates with the core network component 102 via a radio air interface. One or more radio base stations (not explicitly shown) located at one or more base station sites are associated with the RNC 106. As such, the radio base stations define respective cells, such as for example, cells 1:2 112 and 1:3 114 associated with the RNC 106. One or more cells define one or more URAs, such as for example, URA 1 108 and URA 2 110 associated with the RNC 106.

Figure 11:
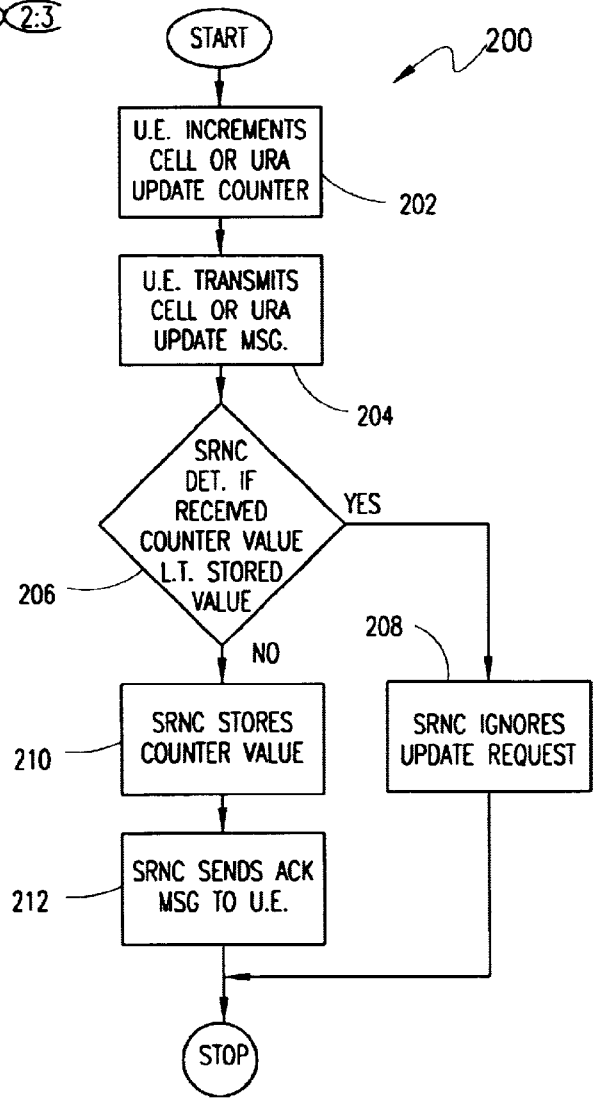
FIG. 11 is a flow diagram of an exemplary signalling method that can be used, for example, with the system portion shown in FIG. 10 to implement the preferred embodiment of the present invention.

FIG. 11 is a flow diagram of an exemplary signalling method 200 that can be used, for example, with the system portion 100 shown in FIG. 10 to implement the preferred embodiment of the present invention. Specifically, for this embodiment, the method 200 shown can be used for performing Cell-Updates and/or URA-Updates when a UE moves from one cell (and/or URA) to another, or the UE switches from a URA_PCH state to a CELL_PCH state. As such, the present method 200 can be used if the UE 116 reports a change in its location, for example, on a cell basis (e.g., Cell-Update) or a URA basis (e.g., URA-Update). Consequently, for this embodiment, the present invention ensures that an appropriate network entity (e.g., RNC) can accurately follow the location of a UE even if the network entity receives out-of-sequence Cell-Update or URA-Update (movement) signalling messages from the UE. Referring to FIGS. 10 and 11, at step 202 of the present method, assume that the UE 116 moves from cell 1:2 112 to cell 1:3 114. The move is denoted by the dotted and solid broken arrows from the UE 116 to these cells. Notably, as shown, the UE 116 is also moving from one URA 108 to another 110. However, for the sake of clarity, although the method 200 can be used for either Cell-Updates or URA-Updates, the following description focuses more on the use by a UE of Cell-Update signalling messages to report inter-cell movement to an SRNC (e.g., RNC 106). The same or a substantially similar method can also be used by a UE to report inter-URA (or other) movement to an SRNC using URA-Update signalling messages.

Returning to step 202, in order to report the move between cells, the UE 116 increments a sequence counter by 1 in preparing a Cell-Update signalling message to send to the SRNC. For example, using the established UTRAN message format, a sequence counter field can be formulated as (Cell_Upd_Seq_No), and the value in the sequence counter field can be incremented by 1. Initially, the sequence counter value can be zero.

Notably, it should be understood that the value of the sequence counter is being incremented for each new update as an aid in understanding the present invention. Nevertheless, the present invention is not intended to be so limited and can include incrementing or decrementing a sequence counter under appropriate conditions. For example, the invention can include incrementing or decrementing a sequence counter by a predetermined value. As another example, the invention can include a counter that uses values from a deterministic series of numbers (i.e., known beforehand by the SRNC and UE) in an incrementing or decrementing order.

At step 204, the UE 116 transmits a Cell-Update Request message, which includes the latest value of the sequence counter, via the radio air interface to the SRNC. In this case, the UE has established a connection with the SRNC via the cell 1:3 114, or a Cell-Connected state. Again, the UE could alternatively be sending a URA-Update Request message to the SRNC. In that case, the format of the sequence counter can be formulated as (URA_Upd_Seq_No), and the value of the counter can be incremented by 1.

At step 206, the SRNC (e.g., 106) detects the received Cell-Update Request message from the UE 116. For this exemplary embodiment, the SRNC determines whether or not the sequence counter value in the received Cell-Update message is less than the previously received (and stored in local memory) sequence counter value. For example, the previously received and stored sequence counter value could represent the UE's prior move from cell 1:1 to 1:2 112. If the sequence counter value in the received Cell-Update message is less than the previously received (and stored) sequence counter value, then at step 208, the SRNC 106 initiates no control actions in response to this Cell-Update Request message, and does not store this received sequence counter value. Notably, at this step, for design considerations, the present invention can also cover a method whereby an SRNC is looking for a received counter value that is not less than the previously received and stored counter value (e.g., if the UE is decrementing the sequence counter value).

Otherwise, at step 206, if the received sequence counter value is not less than the previously received and stored sequence counter value, then at step 210, the SRNC stores (e.g., in local memory) the newly received sequence counter value. At step 212, the SRNC 106 sends a Cell-Update Response signalling message to the UE via cell 1:3 114, which (among other things) acknowledges to the UE that the corresponding Cell-Update Request-message was correctly received (including receipt of a valid sequence counter value). Again, in the case where inter-URA movement is involved, the SRNC can send a URA-Update Response message to the UE, which acknowledges that the corresponding URA-Update Request message was received (including receipt of a valid sequence counter value). As such, using the above-described method 200, the SRNC can ensure that the location of the UE is tracked accurately, despite the possible receipt of out-of-sequence Cell-Update messages and/or URA-Update messages.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for performing mobile terminal movement updates in a cellular communication system, comprising the steps of:
    in response to a predetermined movement, preparing a mobile terminal movement update message;
    sequencing a counter by a predetermined value, said counter associated with said mobile terminal movement update message;
    transmitting said mobile terminal movement update message and said sequenced counter value;
    a network unit receiving said mobile terminal movement update message and said counter value;
    said network unit determining whether said received counter value is not less than a stored counter value; and
    if said received counter value is not less than said stored counter value, storing said received counter value to replace said stored counter value.

2. The method of claim 1, further comprising the step of not storing said received counter value if said received counter value is less than said stored counter value.

3. The method of claim 1, further comprising the step of said network unit conveying a mobile terminal movement update acknowledgment message.

4. The method of claim 1, wherein said predetermined movement comprises an inter-cell movement by a UE.

5. The method of claim 1, wherein said predetermined movement comprises an inter-URA movement by a UE.

6. The method of claim 1, wherein said predetermined movement is associated with a change from URA_PCH state to a CELL_PCH state.

7. The method of claim 1, wherein said cellular communication system comprises a UMTS.

8. The method of claim 1, wherein said cellular communication system comprises an IMT-2000 system.

9. The method of claim 1, wherein said cellular communication system comprises a Time-Division Multiple Access system.

10. The method of claim 1, wherein said cellular communication system comprises a Code-Division Multiple Access system.

11. The method of claim 1, wherein said cellular communication system comprises a cdma2000 system.

12. The method of claim 1, wherein said cellular communication system comprises a GSM system.

13. The method of claim 1, wherein said cellular communication system comprises a General Packet Radio Service (GPRS) system.

14. The method of claim 1, wherein said network unit comprises an RNC.

15. The method of claim 1, wherein said sequencing step comprises an incrementing step.

16. The method of claim 1, wherein said sequencing step comprises a decrementing step.

17. The method of claim 1, wherein the sequencing step comprises incrementing a counter with values derived from a deterministic series of numbers.

18. The method of claim 1, wherein the sequencing step comprises decrementing a counter with values derived from a deterministic series of numbers.

19. The method of claim 1, wherein said network unit comprises an SRNC, said SRNC initiating a relocation procedure responsive to the step of receiving said mobile terminal movement update message.

20. An apparatus for performing mobile terminal movement updates in a cellular communication system, comprising:
    a mobile terminal; and
    a network unit coupled to said mobile terminal for communication therebetween, said mobile terminal including:
        means for preparing a mobile terminal movement update message in response to a predetermined movement;
        means for sequencing a counter by a predetermined value, said counter associated with said mobile terminal movement update message; and
        means for transmitting said mobile terminal movement update message and said sequenced counter value;
    said network unit including:
        means for receiving said mobile terminal movement update message and said counter value;
        means for determining whether said received counter value is not less than a stored counter value; and
        means for storing said received counter value to replace said stored counter value if said received counter value is not less than said stored counter value.

21. The apparatus of claim 20, further comprising means for not storing said received counter value if said received counter value is less than said stored counter value.

22. The apparatus of claim 20, said network unit further comprising means for conveying a mobile terminal movement update acknowledgment message.

23. The apparatus of claim 20, wherein said predetermined movement comprises an inter-cell movement by a UE.

24. The apparatus of claim 20, wherein said predetermined movement comprises an inter-URA movement by a UE.

25. The apparatus of claim 20, wherein said predetermined movement is associated with a change from a URA_PCH state to a CELL_PCH state.

26. The apparatus of claim 20, wherein said cellular communication system comprises a UMTS.

27. The apparatus of claim 20, wherein said cellular communication system comprises an IMT-2000 system.

28. The apparatus of claim 20, wherein said cellular communication system comprises a Time-Division Multiple Access system.

29. The apparatus of claim 20, wherein said cellular communication system comprises a Code-Division Multiple Access system.

30. The apparatus of claim 20, wherein said cellular communication system comprises a cdma2000 system.

31. The apparatus of claim 20, wherein said cellular communication system comprises a GSM system.

32. The apparatus of claim 20, wherein said cellular communication system comprises a General Packet Radio Service system.

33. The apparatus of claim 20, wherein said network unit comprises an RNC.

34. The apparatus of claim 20, wherein said sequencing means comprises an incrementing counter.

35. The apparatus of claim 20, wherein said sequencing means comprises a decrementing counter.

36. The apparatus of claim 20, wherein the sequencing means comprises counter means for incrementing with values derived from a deterministic series of numbers.

37. The apparatus of claim 20, wherein the sequencing means comprises counter means for decrementing with values derived from a deterministic series of numbers.

38. The apparatus of claim 20, wherein said network unit further includes means for initiating a relocation procedure responsive to receipt of said mobile terminal movement update message.

* * * * *